United States Patent

[11] 3,568,049

[72] Inventor Robert D. Barton
 Houston, Tex.
[21] Appl. No. 787,804
[22] Filed Dec. 30, 1968
[45] Patented Mar. 2, 1971
[73] Assignee AMF Incorporated
 New York, N.Y.

[54] ADJUSTABLE SEARCH SHOE FOR USE IN NONDESTRUCTIVE TESTING OF TUBULAR MEMBERS
 12 Claims, 7 Drawing Figs.

[52] U.S. Cl. .................................................. 324/34,
 324/37
[51] Int. Cl. .................................................. G01r 33/00
[50] Field of Search .................................. 324/37, 40,
 34, 64 (Cursory)

[56] References Cited
 UNITED STATES PATENTS
 2,476,943 7/1949 Brady ........................... 324/64
 2,650,344 8/1953 Lloyd ........................... 324/37
 3,244,972 4/1966 Fisher .......................... 324/37
 3,361,961 1/1968 Zoellick ........................ 324/37

Primary Examiner—Rudolph V. Rolinec
Assistant Examiner—R. J. Corcoran
Attorneys—George W. Price and John H. Gallagher ABSTRACT: A search shoe for use in nondestructive testing of metallic tubular objects. The curvature of the objecting engaging surface of the shoe may be adjusted to closely conform to the wall of any tubular object whose diameter is within a given range.

3,568,049

INVENTOR.
ROBERT D. BARTON
BY
John H. Gallagher
ATTORNEY

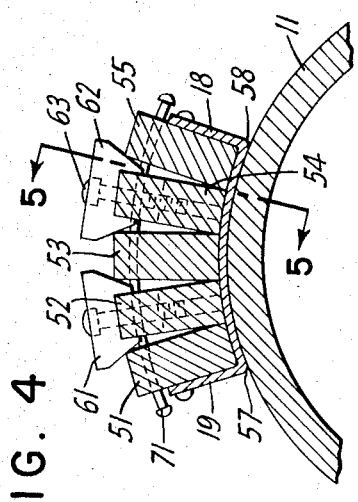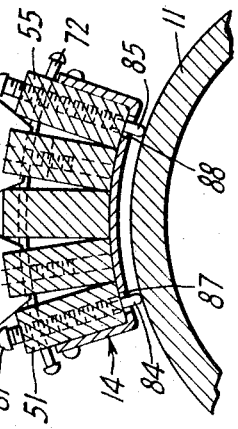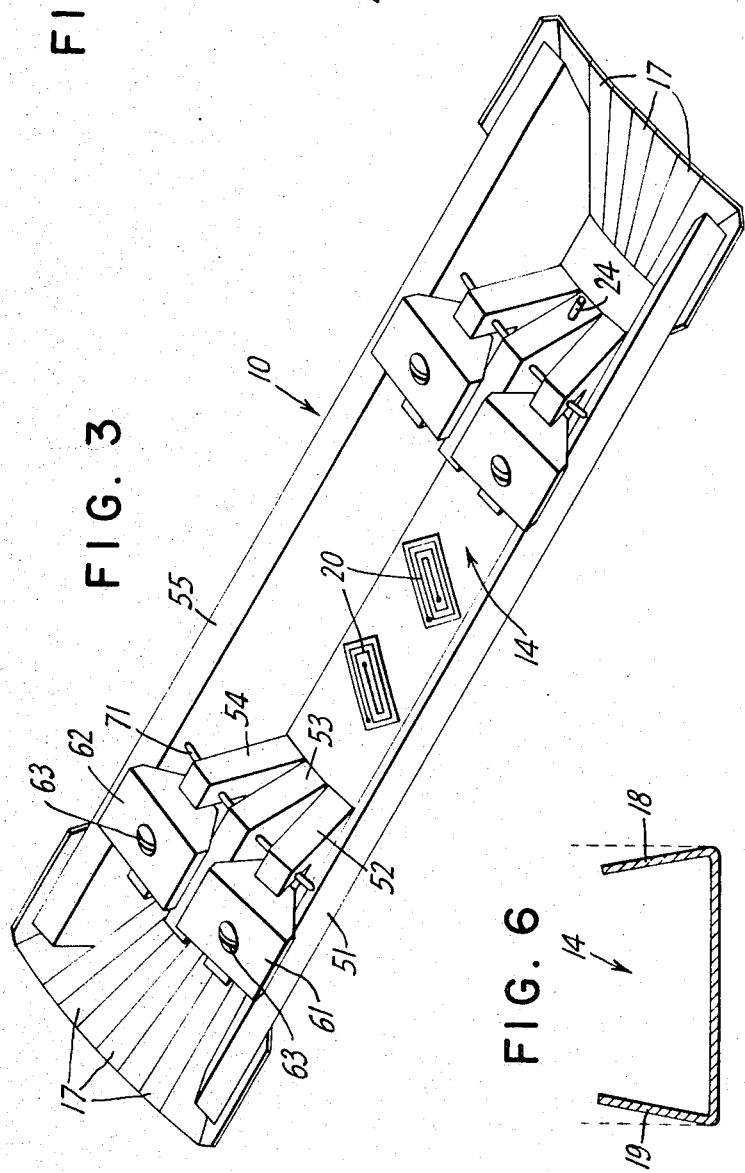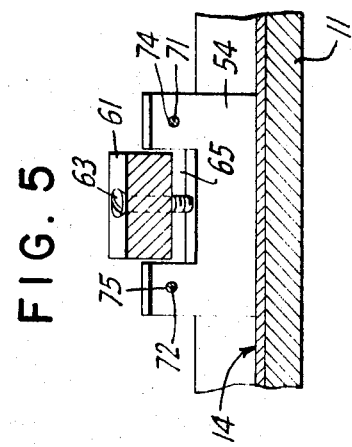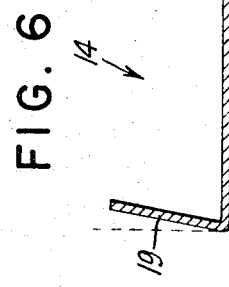
INVENTOR.
ROBERT D. BARTON
BY John H. Gallagher
ATTORNEY 3,568,049

ADJUSTABLE SEARCH SHOE FOR USE IN NONDESTRUCTIVE TESTING OF TUBULAR MEMBERS

BACKGROUND OF THE INVENTION

1. Field of the Invention

This invention relates to a search shoe which is to be used in the nondestructive testing of ferromagnetic tubular members. The shoe has a curved surface which is adjustable in curvature to closely conform to and slide on or adjacent to the surface of any tubular member whose diameter is within a range of diameters.

2. Description of the Prior Art

In the nondestructive testing of ferromagnetic tubular objects such as steel pipes it is customary to pass a unidirectional magnetic flux through the portion of the pipe being tested and detect any change in the flux field caused by an anomaly or defect in the structure of the pipe. The defect diverts the magnetic flux flowing through the wall of the pipe and causes a portion of it to leak to the exterior of the surface of the pipe. This leakage flux is detected by one or more electrical coils, called search coils, which are positioned close to the surface of the pipe and have a relative motion with respect to the pipe so that a voltage is generated in a coil as it passes through the leakage flux.

Search coils are maintained in close proximity to the surface of the pipe by means of structures called search shoes which slide or roll along the surface of the pipe. Quite commonly these shoes are machined or cast structures shaped somewhat like a rigid boat or sled whose bottom side has a fixed curvature which conforms to the curvature of a given sized pipe. The search coils are located inside and adjacent to the bottom of the search shoe and in close proximity to the pipe surface when the curved bottom side of the search shoe is in contact with the pipe. Because the flux leakage field exists quite close to the surface of the tubular member being inspected and diminishes in strength quite rapidly as the distance from the surface increases, it is important that the search shoes have a curved surface that conforms as closely as possible to the curvature of the tubular member being inspected.

In the past, search shoes were relatively expensive to manufacture, and additionally, because of their rigid nature and the fixed curvatures on their pipe engaging surfaces, one shoe could be used to inspect only pipes of one given diameter. Because one complete pipe inspecting apparatus may utilize many search shoes, and because that apparatus must be able to inspect pipes of many different diameters, it was necessary to have available for immediate use many different sets of search shoes, one set for each different pipe size. Furthermore, the shoes are subject to considerable wear and have a limited useful life so that spare search shoes had to be kept in stock. For these reasons, a considerable financial investment was required just to provide the search shoes that were required for one unit of pipe inspecting apparatus.

SUMMARY OF THE INVENTION

The invention relates to a search shoe for use in nondestructive testing of tubular objects and more particularly relates to an object engaging member having an adjustable curved surface which is adapted to slide on or closely adjacent to the surface of the object being tested. The member preferably is made of a thin unitary sheet of nonmagnetic material having springlike characteristics. The member has an elongated curved portion, or surface, adapted to conform to the curvature of a tubular object having any diameter within a range of diameters. Side skirts extend away from the curved portion in a manner to form reverse bends in the sheet of material at the two edges of the curved portion. Disposed transversely between the side skirts are a plurality of rigid bars that extend parallel to said side skirts. Preferably at least the outermost bars extend substantially the entire length of the object engaging member, and side skirts are respectively attached throughout their lengths thereto. Wedge means are insertable between various ones of the bars at their edges farthest removed from the curved surface. The portions of the rigid bars in contact with the curved portion are in intimate pivotal contact with each other and are restrained from separating from each other by the reverse bends at the edges of the curved portion. The wedge means may be further inserted between the blocks to cause their outer edges to spread or separate, and at the same time causing the edges closest the curved portion to pivot and form a tighter curvature. Simultaneously, the side skirts are caused to be inclined further away from each other. The side skirts act somewhat as lever arms which act about the respective reverse bends to cause the curved portion of the object engaging member to take on more curvature. Withdrawal of the wedge means has the reverse effect to decrease the curvature of the curved portion of the object engaging member.

BRIEF DESCRIPTION OF DRAWINGS

FIG. 3 is a perspective view showing in more detail the construction of a search shoe of this invention;

FIG. 4 is a cross-sectional view taken at section 4—4 of FIG. 1 and illustrating in greater detail the novel means for adjusting the curvature of the object engaging surface of the shoe;

FIG. 5 is a sectional view of the adjusting means taken through section 5—5 of FIG. 4, and showing only the adjusting means;

FIG. 6 is a cross-sectional view showing the preformed object engaging member of the search shoe of this invention; and FIG. 7 is a cross-sectional view illustrating an embodiment of the invention which eliminates the abrasive wear on the object engaging surface of the search shoe.

DETAILED DESCRIPTION OF INVENTION

In describing the present invention it will be assumed, for the purpose of an example, that the tubular members being inspected are ferromagnetic pipes that commonly are used to transport fluid materials such as oil, gas, and other petrochemical products.

Figure 1:
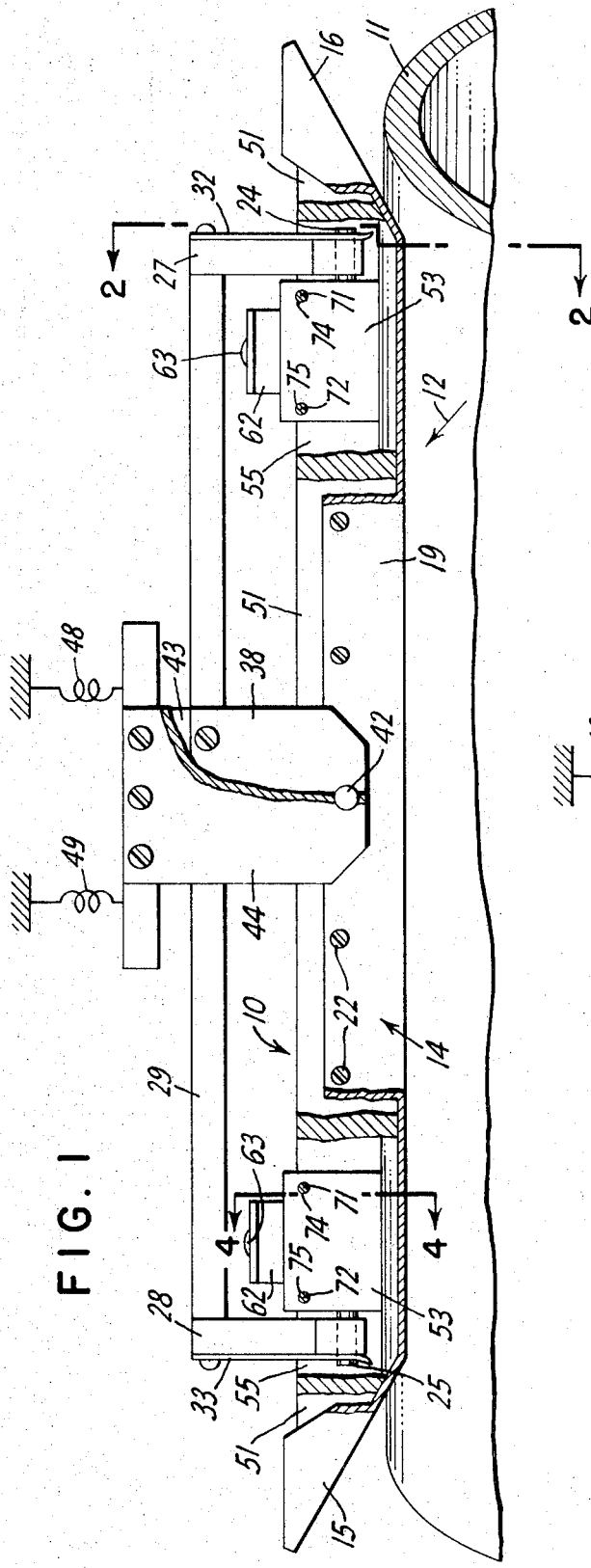
FIG. 1 is a side view, partially broken away, illustrating the search shoe of this invention and the means for supporting it on a pipe that is being inspected.
Figure 2:
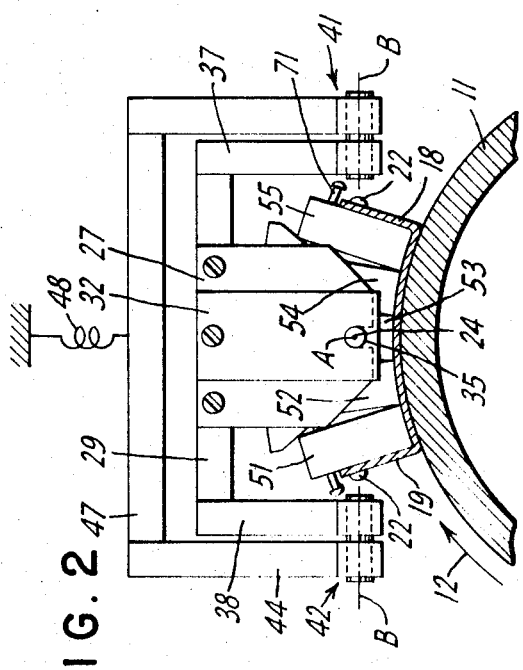
FIG. 2 is a sectional view of the search shoe taken at section 2—2 of FIG. 1.

Referring now in detail to the accompanying drawings, and in particular to FIGS. 1—3, the search shoe 10 of this invention is adapted to slide on, or closely adjacent to, the surface of a pipe 11 which is being inspected for defects. The search shoe 10 and the pipe 11 may have a relative motion with respect to each other in a direction indicated by the arrow 12 so that the search shoe scans a helical path about the surface of the pipe. The search shoe is comprised of an object engaging member 14 which is made from a thin flexible unitary sheet of a nonmagnetic material such as stainless steel or a copper alloy. The leading and trailing edges 15 and 16 of the object engaging member are inclined upwardly from the surface of pipe 11 and include a plurality of flexible striker leaves 17, as best seen in FIG. 3. Object engaging member 14 has side skirts 18 and 19, FIG. 2, which extend upwardly from its object engaging surface and are fastened to respective bars 55 and 51 of the curvature adjusting means, to be described later, by suitable means such as screws 22.

As seen in FIG. 3, electrical search coils 20 are located on the inner curved surface of object engaging member 14 in the region between the curvature adjustment means. Preferably, search coils 20 are printed circuit coils, printed on a backing of a thin, pliable, plastic sheet of an insulating material such as Mylar. Suitable connecting terminals also are printed on the plastic sheet and provide means for connecting the coils to input leads of the defect signal circuitry in the inspection apparatus. The plastic backing with the search coils printed thereon is secured, as by gluing, to the curved surface of object engaging member 14, with appropriate steps being taken to electrically insulate the coils 20 from the conductive metal from which member 14 is made. The flexible and pliable nature of the printed circuit coils and the backing plastic sheet is well suited for the adjustable curvature search shoe of this invention because they can withstand repeated flexing without suffering physical or electrical damage. As may be seen, the search coils will be quite close to the surface of the pipe to be inspected, being spaced therefrom only by the thickness of the material of object engaging member 14. If desired, a thin coating of a wear resistant material may be applied to the object engaging surface of the member 14.

Mechanisms for adjusting the curvature of the object engaging surface of member 14 are located near the two ends of the shoe and include the horizontally extending pins 24 and 25 upon which the search shoe is supported and connected to the remainder of the inspection apparatus. The supporting means include the axially spaced yokes 27 and 28 which have recesses at their bottom edges to receive the respective pins 24 and 25. Yokes 27 and 28 each are attached to the rigid axially-extending yoke support member 29 by suitable means such as the illustrated screws. Spring clips 32 and 33 are secured by said screws to the respective outer faces of yokes 27 and 28, and each of the springs has a circular aperture near its bottom edge, such as the aperture 35 of FIG. 2, which pass over the respective pins 24 and 25 to hold the search shoe in a relatively fixed radial position with respect to the supporting structure. The circular apertures in spring clips 32 and 33 are slightly larger in diameter than the pins 24 and 25 to provide pivot joints so that the shoe may rotate or rock with respect to the supporting structure.

Pivot arms 37 and 38, FIG. 2, are secured to and extend downwardly from opposite sides of yoke support member 29 and are respectively joined by means of pivot joints 41 and 42 to the side arms 43 and 44 of a relatively fixed supporting bracket. The supporting bracket also includes a bracket plate 47 which is attached to the remainder of the inspection apparatus by relatively stiff resilient means such as the illustrated springs 48 and 49. With the supporting means illustrated in FIGS. 1 and 2, the search shoe 10 may pivot about the colinear axes A that pass through pins 24 and 25, FIG. 2, and about the colinear axes B that pass through pivot joints 41 and 42, thus giving the search shoe a freedom of movement about orthogonal axes to allow the search shoe to follow along on the surface of a pipe irrespective of minor irregularities in the shape and/or axial alignment of the pipe. The stiff resilient means illustrated by the springs 48 and 49 urge the search shoe into contact with the pipe yet allow the shoe to move upwardly to ride over collars and joints which may be encountered. Other suitable means may be employed in the place of the illustrated springs.

The adjustment means for changing the curvature of the object engaging surface of the search shoe 10 will be explained by referring in detail to FIGS. 3, 4, and 5. As illustrated in FIG. 3, an adjusting mechanism is located at each end of the shoe 10 and since both are identical, only one will be referred to in the following description. As illustrated, the adjustment means includes five rigid solid bars 51—55, made from a nonmagnetic metal such as aluminum. The outermost bars 51 and 55 extend substantially the entire length of the search shoe 10 and form parts of both adjusting mechanisms, while the innermost bars 52, 53, and 54 are shorter in length. Bars 51—55 are placed within the object engaging member 14 with their adjacent bottom edges intimately in contact with each other and with the outermost bottom edges of blocks 51 and 55 in intimate contact with the outer corners 57 and 58 of the object engaging member 14, see FIG. 4. Each of the blocks 52 and 54 has mounted thereon a respective wedge 61 and 62, the mounting arrangement being clearly illustrated in FIG. 5. A screw 63 is rotatably supported in the wedge 61 and threadably engages a hole in the mounting block 54. Rotation of the screw 63 causes the wedge 61 to be raised or lowered out of or into the cutout portion 65 of mounting bar 54. As illustrated in FIG. 4, the wedge 61 holds the upper edges of bars 51 and 53 spaced from the upper edges of the mounting block 52, and wedge 62 holds the edges of blocks 53 and 55 from the upper edges of mounting block 54. Relatively stiff but resilient circular wires 71 and 72 pass through oversized holes 74 and 75 in the blocks so as to keep the blocks from being displaced out of transverse position between side skirts 18 and 19, but permitting adjacent blocks to move toward and away from each other. The flexible and springlike character of the object engaging member 14, whose side skirts 18 and 19 are attached throughout their lengths to the outermost bars 51 and 55 by the screws 22, tends to urge the top edges of the bars 51—55 together, but it is seen that these edges are maintained in spaced-apart relation by the wedges 61 and 62.

Assuming that it is desired to increase the curvature of the bottom curved object engaging surface of the member 14, the screws 63 passing through wedges 61 and 62 are turned so as to force the wedges further down between the spaced blocks. Because the bottom edges of the blocks 51—55 are restrained against moving outwardly by the outer corners 57 and 58 of object engaging member 14, the bottom portions of the blocks tend to pivot with respect to each other so that their bottom surfaces form a tighter curvature. At the same time, the side skirts 18 and 19 are urged outwardly by bars 55 and 51, and because the side skirts are secured throughout their lengths to bars 55 and 51 they take on the characteristics of rigid members and act somewhat as lever arms which act about the reverse bends in the material at corners 57 and 58 to impart more curvature to the bottom surface of the object engaging member 14 which takes on the curvature defined by the chordlike segments formed by the bottom surfaces of blocks 51—55.

To assure that the bottom surface of object engaging member 14 assumes a smoothly curved contour, the object engaging member 14 is preformed during its manufacture so that its skirts 18 and 19 are inclined slightly inwardly with respect to each other, see FIG. 6, whereby they each join the bottom surface at an acute angle. It has been found that when each skirt is bent inwardly approximately 10°, the bottom surface always will assume the desired smoothly curved contour when the skirts are urged outwardly, and there is no tendency for flat chordlike segments to form across the curved surface.

When the wedges 61 and 62 are withdrawn outwardly so that they do not penetrate as deeply within the cutout portions 65 of their responsive mounting blocks 54 and 53, the springlike character of the object engaging member 14 will urge the blocks 51—55 toward each other and will keep them in intimate contact with the sides of the wedges 61 and 62, thereby decreasing the curvature of the bottom surface of object engaging member 14.

For the object engaging member to function in its intended manner to impart the desired curvature to its bottom surface, the material must be flexible and springlike, yet must possess enough stiffness to permit the skirts to function somewhat like levers, as previously explained. For a search shoe which was approximately 12.5 inches long and 1.87 inches wide, I used beryllium copper sheeting have an approximate thickness of .0159 inch. Other nonmagnetic materials may be used so long as they are flexible and springlike in nature, and do not exceed their yield point during the adjustment of the curvature.

The surface of object engaging member 14 which slides on the pipe 10 is subject to considerable wear due to abrasive contact with pipe 11, thus requiring periodic replacement of the member 14. This situation may be somewhat improved by the embodiment of the invention illustrated in FIG. 7 wherein the outermost bars 51 and 55 which extend substantially the entire length of search shoe 10 each has extending therethrough at several spaced locations along their lengths threaded wear pins such as pins 81 and 82 which have hard, wear resistant tips 84 and 85 that extend through apertures 87 and 88 in the bottom surface of object engaging member 14 and contact the surface of pipe 11. The tips 84 and 85 may be made of a ceramic material, a refractory metal, or other wear resistant nonmagnetic material. Wear pins 81 and 82 are adjusted so that the wear resistant tips 84 and 85 contact pipe 11 and maintain the bottom surface of object engaging member 14 slightly spaced from the surface of pipe 11, thereby eliminating any wear on the member 14 itself. As tips 84 and 85 wear away due to abrasion, wear pins 81 and 82 are inserted further into bars 51 and 55 to maintain object engaging member 14 spaced from pipe 11.

In the above-described drawings, only the outermost bars 51 and 52 of the curvature adjustment means are illustrated as extending substantially the full length of search shoe 10. If desired, all of the bars 51—55 could extend the full length of the shoe in the same manner as bars 51 and 55. In such an embodiment, it is preferable that the two pairs of wedges be employed in the same manner as illustrated. The innermost bars would be cut out along their bottom edges to provide clearance space for the search coils 20.

I claim:

1. An adjustable search shoe for use in nondestructive testing of tubular members, wherein the search shoe is adapted to slide on, or closely adjacent to, the curved surface of any tubular object having a diameter within a given range of diameters, comprising the combination:
   an elongated object engaging member made of a thin sheet of springlike nonmagnetic material and having a curved surface to substantially conform to a portion of the curved surface of a tubular object having a diameter within said range;
   first and second side members extending along substantially the entire length of the object engaging member and joined to said surface at respective opposite edges thereof;
   said side members extending away from the curved surface in the direction away from a tubular object when the object engaging member is on or adjacent to the object;
   means for changing the separation between said side members at their ends furthest removed from said curved surface; and
   said side members having the characteristics of rigid members to act somewhat as lever arms which act about said opposite edges to impart more or less curvature to said curved surface as the separation between the side members is increased or decreased, respectively.

2. An adjustable search shoe for use in nondestructive testing of tubular members, wherein the search shoe is adapted to slide on, or closely adjacent to, the curved surface of any tubular object having a diameter within a given range of diameters, comprising the combination:
   an elongated object engaging member made of a thin sheet of resilient nonmagnetic material and having a curved surface to substantially conform to a portion of the curved surface of a tubular member having a diameter within said range, said surface being curved across the dimension of the member which is transverse to its direction of elongation;
   first and second side skirts formed on said member and joining said curved surface at reverse bends along respective edges of the curved surface;
   curvature adjusting means disposed between said skirts and operable to change the curvature of the curved surface, said adjusting means comprising;
   a plurality of rigid spacing means extending in a direction parallel to said skirts and disposed adjacent each other between said skirts;
   each of said spacing means having a first portion in contact with the object engaging member on the reverse side of said curved surface and being held in pivotal contact with each other in their respective first portions by the constraining force applied by said reverse bends acting on the rigid spacing means;
   means for securing said skirts to the respective outermost ones of said spacing means; and
   means for varying the separation between the spacing means at their portions thereof farthest removed from said reverse side.

3. An adjustable search shoe for use in nondestructive testing of tubular members, wherein the search shoe is adapted to slide on, or closely adjacent to, the curved surface of any tubular object having a diameter within a given range of diameters, comprising the combination:
   an elongated object engaging member made of a thin sheet of resilient nonmagnetic material and having a curved surface to substantially conform to a portion of the curved surface of a tubular member having a diameter within said range, said surface of the object engaging member being curved across the dimension of the member which is transverse to its direction of elongation;
   first and second side skirts formed on said object engaging member and joining said curved surface at reverse bends along respective edges of the curved surface;
   curvature adjusting means disposed between said skirts and operable to change the curvature of the curved surface, said adjusting means comprising;
   A plurality of rigid rectangular bars extending in a direction parallel to said skirts and disposed between said skirts; 2 Each of said bars having a surface in contact with the object engaging member on the reverse side of the curved surface and the adjacent edges of the bars closest said reverse side being in pivotal contact with each other, said edges being restrained from separating from each other by said reverse bends along the edges of the curved surface;
   means or securing said skirts to respective outermost ones of said bars;
   wedge means insertable between various ones of the bars at their edges farthest removed from said reverse surface; and
   means for adjusting the depth of insertion of said wedges between said bars to change the separation between the bars at said farthest edges, whereby the separation of said bars at their farthest edges cause the bars to pivot at their adjacent edges nearest said reverse side, and thereby change the curvature formed by the sides of the bars nearest the reverse side, the change in separation of said bars changing the angle that said skirts make with the curved surface at said reverse bends and imparting a new curvature to the curved surface.

4. The combination claimed in claim 3 wherein:
   said outermost bars extend substantially the entire length of said elongated object engaging member.

5. The combination claimed in claim 4 wherein:
   the remainder of said bars are shorter in length than the outermost ones and are located along a portion of the length of said object engaging member.

6. The combination claimed in claim 5 wherein:
   the rigid bars between the outermost ones are arranged in a plurality of groups that are spaced along said elongated object engaging member, and wherein:
   insertable wedge means are associated with each of said groups.

7. The combination claimed in claim 3 wherein:
   said wedge means are inserted between alternate ones of said bars and are supported on respective rigid bars having a cutout portion to permit the insertion of a wedge means therein.

8. The combination claimed in claim 3 wherein:
   said object engaging member is formed of a unitary sheet of thin nonmagnetic material and said curved surface and side skirts are formed in said sheet.

9. The combination claimed in claim 8 and further including:
   resilient striker means formed at the respective ends of said object engaging member; and
   said striker means being inclined upwardly away from said curved surface to permit the object engaging member to slide up and over protrusions on the surface of a tubular member being tested.

10. The combination claimed in claim 3 and further including:

a plurality of wear pins extending through selected ones of said rigid bars and through said curved surface of the object engaging member and adapted to maintain said curved surface slightly spaced from the surface of the object being tested; and said wear pins having wear resistant tips adapted to contact the surface of the object being tested.

11. The combination claimed in claim 3 wherein:

said object engaging member is preformed with said side skirts inclined inwardly toward each other, thereby forming the reverse bends along the opposite edges of the curved surface.

12. The combination claimed in claim 3 and further including:

resilient means extending transversely through said rigid bars to prevent said bars from becoming displaced out of transverse position between said side skirts but permitting adjacent bars to pivot toward and away from each other.